United States Patent

Zaiki et al.

Patent Number: 6,119,221
Date of Patent: Sep. 12, 2000

[54] INSTRUCTION PREFETCHING APPARATUS AND INSTRUCTION PREFETCHING METHOD FOR PROCESSING IN A PROCESSOR

[75] Inventors: Koji Zaiki, Hirakatashi; Tetsuya Tanaka, Ibarakishi, both of Japan

[73] Assignee: Matsushita Electric Industrial Co., Ltd., Japan

[21] Appl. No.: 08/959,303

[22] Filed: Oct. 28, 1997

[30] Foreign Application Priority Data

Nov. 1, 1996 [JP] Japan .................................. 8-291433

[51] Int. Cl.$^7$ ...................................... G06F 9/44
[52] U.S. Cl. .......................... 712/237; 712/233; 712/234; 712/236
[58] Field of Search ................... 712/234, 233, 712/239, 235, 236, 237, 238

[56] References Cited

U.S. PATENT DOCUMENTS

| | | | |
|---|---|---|---|
| 4,853,840 | 8/1989 | Shibuya | 712/237 |
| 5,317,703 | 5/1994 | Hiraoka et al. | 712/239 |
| 5,394,530 | 2/1995 | Mayumi | 712/240 |
| 5,715,440 | 2/1998 | Ohmura et al. | 712/233 |

FOREIGN PATENT DOCUMENTS

| | | |
|---|---|---|
| 0 133 477 | 2/1985 | European Pat. Off. . |
| 0 307 957 | 3/1989 | European Pat. Off. . |
| 0 376 258 | 7/1990 | European Pat. Off. . |
| 2-110734 | 4/1990 | Japan . |
| 6-161750 | 6/1994 | Japan . |

OTHER PUBLICATIONS

White, W. W., "How Does Processor MHz Relate to End–User Performance? Part 1: Pipelines and Functional units", IEEE Micro, vol. 13, No. 4, Aug. 1, 1993, pp. 8–16, XP000385025, p. 11, left–hand col., line 40–right–hand col., line 15.

Oehler, R. R. et al.: "IBM Risc System/6000 Processor Architecture" IBM Journal of Research and Development, vol. 34, No. 1, Jan. 1, 1990, pp. 23–36, XP000128179, p. 26, right col., lines 17–25.

Primary Examiner—Richard L. Ellis
Assistant Examiner—Mackly Monestime
Attorney, Agent, or Firm—Parkhurst & Wendel, L.L.P.

[57] ABSTRACT

The present invention intends to provide an instruction prefetching apparatus capable of reducing a delay caused by branch prediction error by prefetching instruction based on a condition of a conditional branch instruction if the condition is already determined at the prefetching of the branch instruction. In the apparatus, a first decoding unit judges whether or not a processed instruction is a conditional branch instruction or not and whether or not the instruction is a condition generate instruction which determines branch condition. A condition determination signal generating means compares an address of a condition generate instruction with the content of a program counter to judge whether the condition is already determined or not, and according to the judgment, outputs a condition determination signal to a condition determination judging unit. In response to the signal input, the condition determination judging unit outputs prefetch address information for generating address to a prefetch address generating unit, using a condition code.

11 Claims, 9 Drawing Sheets instruction prefetching apparatus

Fig.8 Prior Art program

ADD D0, D1, D2 ~400

BNZ LABEL ~401

SET 0, D1 ~402

LABEL : SET 1, D1 ~403

INSTRUCTION PREFETCHING APPARATUS AND INSTRUCTION PREFETCHING METHOD FOR PROCESSING IN A PROCESSOR

FIELD OF THE INVENTION

The present invention relates to an instruction prefetching apparatus and an instruction prefetching method, more particularly, to an instruction prefetching apparatus and an instruction prefetching method for realizing efficient pipeline processing in a processor.

BACKGROUND OF THE INVENTION

Now, most computer employs von Neumann architecture which stores programs as well as data in a storage unit and reads the stored program to be executed. Generally, a von Neumann computer is implemented by a computer system consisting of a main frame computer which includes a processor such as a CPU for controlling program execution and a main memory for temporarily storing programs and data, an input-output (I/O) unit for performing input and output between the computer and users or external units, an auxiliary storage unit (secondary storage unit) for storing programs and data in an extended period of time, and other units.

In the execution of a program under the processor's control, instructions of the program stored in the main storage unit are read, and based on the contents of the instructions, instruction processing is performed in which a control signal is sent to each unit of the computer. Therefore, the processor comprises a program counter for designating a location of an instruction to be executed in the main memory and a register such as an instruction register for storing instructions within it.

FIG. 6(a) explains the control operation in the instruction processing under the processor's control. First of all, in an instruction fetch process, the program counter is referred to read an instruction to be executed next. Then, in the instruction decoding process, the type of the read instruction is identified to interpret the instruction. Next, in the instruction executing process, data reading and operation processing are performed according to the instruction. Then, in the result storing process, the result of the execution of the instruction is stored. As shown in the figure, each process is performed within a time corresponding to a machine cycle (hereinafter referred to as timing), and all the processes are performed for a period ranging from a timing $CL_n$ to a timing $CL_{n+3}$.

Normally, program execution is implemented by executing a plurality of instructions sequentially. FIG. 6(b) illustrates the case that instruction A and instruction B are successively executed. In the case shown in FIG. 6(b), the program counter is referred to read instruction A in the instruction fetch process, and in the following instruction decoding process, the content of the instruction A is interpreted; in the instruction execution process, the processing according the instructed content is performed, followed by the result storing process in which the result of the execution of the instruction is stored into a designated location. In the next timing, the instruction fetch process for instruction B is performed to read the instruction B, whereby the sequential processing of the instructions is completed. If the processing of the instruction A is performed from a timing $CL_n$ to a timing $CL_{n+3}$ as shown in FIG. 6(a), the processing of the instruction B starts at a $CL_{n+4}$.

FIG. 6(c) illustrates a pipeline processing which realizes efficient, speedy processing. In this pipeline processing, the four processes: "instruction fetching", "instruction decoding", "instruction executing", and "result storing", can be executed such that the respective processes overlap each other. More specifically, this enables the four control operations to be executed in parallel. At a timing $CL_1$, the instruction fetch process for instruction A is performed, and at the next timing $CL_2$, the instruction A is subjected to decoding processing while instruction B is fetched. At a timing $CL_3$, the execution process to the instruction A, the decoding process to the instruction B, and the fetch process to instruction C are performed. Thus, execution of pipeline processing enables instructions whose number is equal to a pipelining processable number to be processed in parallel, thereby speeding up the whole processing.

If instructions A to D are instructions which allow simple, sequential execution, an idealistic pipeline processing as illustrated can be implemented by processing them in an order in which the instructions are described in a program. However, some programs heavily use repetition, branching, and selecting, and a plurality of programs cannot be executed simply in the order in which the instructions are described. Moreover, the result of a instruction execution process might decide whether the following process should be performed, or branching or selecting should be performed. Therefore, pipeline processing according to the flow of the program is required for enhancing efficiency.

A description is given of a prior art instruction prefetching method associated with a prediction process. In a pipeline processing, instruction fetch processing is performed by predicting an instruction to be executed next before finally determining an address of the instruction. Such instruction fetch process by prediction is called instruction prefetch processing. Now, a description is given of a conventional instruction prefetching apparatus for executing that instruction prefetch processing associated with prediction process in a processor.

FIG. 7 is a block diagram of a prior art instruction prefetching apparatus, FIG. 8 is a diagram showing a part of a program including an instruction as an object of prefetch processing, and FIG. 9 is a timing chart illustrating a schematic operation in the prior art prefetching apparatus.

As shown in FIG. 7, t he prior art instruction prefetching apparatus comprises a prefetch address generating unit 300, a first decoding unit 303, a branch predicting unit 304, an instruction buffer 305, a second decoding unit 306, an operation performing unit 307, and a condition code storage unit 308.

The prefetch address generating unit 300 generates an address of a prefetch target (hereinafter also referred Lo as prefetch address) based on a prediction of the branch predicting unit 304 and a condition code, and outputs a prefetch address signal S301. The first decoding unit 303 performs decoding processing to a prefetched instruction S302 to obtain the instruction and output it to the instruction buffer 305 which is later described. The first decoding unit 303 also identifies the type of the prefetched instruction S302 from the result of the decoding processing, and when the type of the prefetched instruction is a conditional branch instruction, the decoding unit outputs a signal indicating this type of the prefetched instruction to both the branch predicting unit 304 and the prefetch address generating unit 300. The branch predicting unit 304 predicts how branching is performed to process steps and prefetches an instruction subsequent to the condition al branch instruction, and outputs the prediction result to the prefetch address generating unit 300. Prediction methods include a method in which branch direction is predetermined based on branching probability and a method in which branch direction is decided based on a history of the branch directions of the conditional branches used before. The instruction buffer 305 temporarily stores the instruction fetched by the decoding processing of the first decoding unit 303 for a next processing The second decoding unit 306 takes the temporarily stored instruction from the instruction buffer 305, and decodes it sequentially to control the operation process performed by the operation performing unit which is later described, according to the obtained result. The operation performing unit 307 performs operation under control from the second decoding unit 306, and outputs a signal indicating the result of the operation to the condition code storage unit 308 when the result of the operation can affect a condition code stored in the condition code storage unit 308. The condition code storage unit 308 stores a condition code obtained based on the result of the operation processing input from the operation performing unit 307.

The schematic operation of the prior art instruction prefetching apparatus thus configured is as follows.

At a timing, the prefetch address generating unit 200 generates an address of an instruction to be fetched next and outputs it as a prefetch address signal S301. In a processor using the instruction prefetching apparatus, an instruction is fetched using this prefetch address signal S301 and input to the instruction prefetching apparatus. At a next timing, the prefetched instruction is input to the first decoding unit 303 to be subjected to decoding processing.

The first decoding unit 303 judges whether the processed instruction is a conditional branch instruction or not When the instruction is a conditional branch instruction, the first decoding unit 303 outputs a signal indicating this fact to both the prefetch address generating unit 300 and the branch predicting unit 304. The processed instruction is output to the instruction buffer 305 whether that instruction is a conditional one or not.

The instruction temporarily stored in the instruction buffer 305 is then taken by the second decoding unit 306 where the content of the instruction is interpreted through decoding processing. The second decoding unit 306 outputs a signal indicating the content of the obtained instruction to the operation performing unit 307 where the operation processing corresponding to the content of the instruction is performed based on the signal input. The result of the operation processing is processed by a processor including the instruction prefetching apparatus, and when that result can affect a condition code, it is output to the condition code storage unit 308 for storage.

Receiving the signal indicating that the processed instruction is a conditional branch instruction is input from the first decoding unit, the branch predicting unit 304 performs prediction processing according to a predetermined method to output a signal indicating the result of the prediction to the prefetch address generating unit 300.

The prefetch address generating unit 300 generates an address of an instruction to be prefetched next. If the signal indicating conditional branch instruction is not input from the first decoding unit 303, the prefetch address generating unit generates an address of an instruction to be prefetched next with reference to the condition code stored in the condition code storage unit 308 and outputs it as a prefetch address signal S301. On the other hand, if such signal is input from the first decoding unit 303, the prefetch address generating unit generates an address of an instruction to be prefetched next based on the signal informing the prediction input from the branch predicting unit 304, and outputs it as a prefetch address signal S301.

Here a description is given of the case of executing a program shown in FIG. 8 with reference to the timing chart of FIG. 9, which program illustrates the following procedures. In the figure, instruction 400 is an add instruction which instructs to perform addition to the data stored in registers D0 and D1 and stores the result in a register D2. In this program, the result of the operation according to the instruction 400 decides the type of the branch of instruction 401. More specifically, the execution result of the instruction 400 decides a condition code which the instruction 401 as a conditional branch instruction uses to decide the target of the branch. Here it is assumed that a zero flag of a condition code is set when the result is 0. Since the instruction 401 is a conditional branch instruction, branching for the process steps is performed by selecting an instruction to be executed next according to the zero flag of the condition code. If the zero flag is not set, the instruction to be executed next is the instruction 403, whereas the instruction 402 is selected as an instruction to be executed next if the zero flag is set.

Next, a description is given of the operation for executing the program shown in FIG. 8 by a processor including the prior art instruction prefetching apparatus, with reference to the timing chart of FIG. 9.

At a timing $t_1$ shown in the timing chart of FIG. 9, an address of instruction 400 is generated in the prefetch address generating unit 300 to be output as a prefetch address signal S301, inputting it to the instruction prefetching apparatus. The processor using this instruction prefetching apparatus fetches the instruction 400 using the prefetch address signal S301. At a next timing $t_2$, the prefetched instruction 400 is input to the first decoding unit 303 to be subjected to decoding processing.

Since the instruction 400 is not a conditional branch instruction, it is not necessary to output a signal indicating that the processed instruction is a conditional branch instruction, and the instruction 400 is output to the memory buffer 305 The second decoding unit 306 decodes the instruction 400 taken from the instruction buffer 305 to obtain an interpretation that the instruction 400 is an add instruction, outputting the result of the decoding processing to the operation performing unit 307 by means of a signal. The operation performing unit 307 performs the addition instructed by the instruction 400, and since the result of the addition processing according to the instruction 400 can affect a condition code, the operation performing unit outputs the result of the addition to the condition code storage unit 308 where condition code change is stored. As described above, when the result of the addition is 0, a zero flag of a condition code is set, but here it is assumed that the result of the adding is not 0 and thus the zero flag is not set. At a timing $t_3$ of FIG. 9, a conditional flag which decides the condition of a conditional branch of the instruction 401 is determined.

Thereafter, at the timing $t_3$, an address of the instruction 401 is generated to fetch the instruction 401 as a conditional branch instruction. At a timing $t_4$, the fetched instruction is input to the prefetching apparatus to be decoded by the first decoding unit 303. Since the instruction 401 is a conditional branch instruction, a signal indicating this fact is output to both the prefetch address generating unit 300 and the branch predicting unit 304.

Receiving the signal, the branch predicting unit 304 performs prediction and outputs a signal indicating the result to the prefetch address generating unit 300. Here it is assumed that the branch predicting unit 304 is set to predict "an instruction described next in the program". Therefore, a signal indicating "next instruction" is output from the branch predicting unit 304 to the prefetch address generating unit 300. At a timing $t_5$, the prefetch address generating unit 300 generates an address of instruction 402 which is "the next instruction" for the conditional branch instruction 401 and outputs a prefetch address signal S301 indicating "instruction 402". In the processor, the instruction 402 is thus prefetched and input to the first decoding unit 303 at a timing $t_4$ of FIG. 9.

On the other hand, the condition of the conditional branch of the instruction 401 is judged using the conditional flag determined at the timing $t_3$. Since the zero flag is not set according to the above assumption, instruction 403 is the instruction to be executed next. This means that an address of a branch target is determined at a timing $t_6$. At this stage, an address of an instruction to be fetched next have to be determined. However, in this case, that address of the instruction to be fetched next (the address of the instruction 403) does not match the address generated by the prefetch address generating unit 300 (the address of the instruction 402). This means a branch prediction error, and it is necessary to prefetch a next instruction again at a next timing $t_7$.

In the prior art instruction prefetching apparatus above described, an instruction following a conditional branch instruction is prefetched only based on the prediction by the branch predicting unit 304. Then, as shown in FIG. 9, even if the execution of the instruction 400 has been completed when the conditional branch instruction 401 is prefetched and the condition code for this branch instruction is already determined (at the timing $t_3$), it is impossible to decide an instruction to be prefetched next using this result. Therefore, smooth pipeline processing can be performed as long as the prediction comes true, resulting in improved efficiency of the processing. However, when the prediction is not realized, the already fetched instruction has to be canceled to fetch a correct instruction, causing an undesired delay. Further, prefetching the instruction 402 results in a vain operation, which means that the device resource of the whole processor including the prefetching unit is not utilized effectively.

SUMMARY OF THE INVENTION

An object of the invention is to provide an instruction prefetching apparatus capable of reducing a delay resulted from branch prediction error by prefetching an instruction according to a condition of a conditional branch instruction when the condition is already determined at the prefetching of the branch instruction, thereby realizing an efficient processing using its device resources effectively.

Another object of the invention is to provide an instruction prefetching method capable of reducing a display result from a branch prediction error by prefetching an instruction according to a condition of a conditional branch instruction when the condition is already determined at the prefetching of the branch instruction, thereby realizing efficient processing using its device resources effectively.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the invention, an instruction prefetching apparatus for prefetching instruction from a storage unit in a computer executing the instruction, comprising: a branch judging unit for judging whether a prefetched instruction is a branch instruction which instructs branching or not, and outputting a branch signal when that instruction is a branch instruction; a determined condition information generating unit for judging whether a condition deciding to perform the branching of the branch instruction is already determined or not when the branch signal is output, and outputting, to a prefetch address generating unit, determined condition information corresponding to the condition judged to be determined; and a prefetch address generating unit for generating an address of a prefetch target based on the determined condition information input from the determined condition information generating unit. In this apparatus, an instruction address is generated according to a condition which is already determined when an instruction following a branch instruction is prefetched.

According to a second aspect of the invention, the instruction prefetching apparatus defined in the first aspect includes the determined condition information generating unit which comprises: a condition determination signal generating unit for judging whether a condition deciding to perform the branching of the branch instruction is already determined or not and outputting a condition determination signal when the condition is already determined; and a condition determination judging unit for obtaining the determined condition when the condition determination signal is output, and generating determined condition information according to the obtained condition. In this apparatus, a condition determination signal informs whether the condition is already determined or not and the condition already determined can be used.

According to a third aspect of the invention, the instruction prefetching apparatus defined in the second aspect includes the condition determination signal generating unit which comprises: a first instruction address storage unit for storing an address of an instruction output from the branch judging unit; a second instruction address storage unit for storing the address of an instruction being currently executed; and a comparing unit for making a comparison between the address stored in the first instruction address storage unit and that stored in the second instruction address storage unit and outputting the condition determination signal to the condition determination judging unit when the comparison shows that the addresses match. In this apparatus, whether or not the condition is already determined is judged from a comparison between the address of an instruction for determining condition and the address of an instruction being currently executed.

According to a fourth aspect of the invention, in the instruction prefetching apparatus defined in the third aspect, the branch judging unit judges whether a prefetched instruction is a condition generate instruction or not and, when the instruction is a condition generate instruction, outputs an address of the instruction to the first instruction address storage unit and a condition indetermination signal to the condition determination judging unit, and further outputs information indicating the branch condition of the branch instruction to the condition determination judging unit, as the branch signal to be output, and information indicating an address of a branch target of the branch instruction to the prefetch address generating unit. In this means, the judgment of the determination of condition from the comparison between addresses is executed by performing judging processing to a condition generate instruction and storing the address of the instruction.

According to a fifth aspect of the invention, in the instruction prefetching apparatus defined in the fourth aspect, the condition determination judging unit, when the condition determination signal is input, outputs to the prefetch address generating unit condition determination information indicating whether an address to be used is the address of an instruction following the branch instruction or the branch target address, and this unit generates an instruction address according to a determined condition.

According to a sixth aspect of the invention, in the instruction prefetching apparatus defined in the first aspect, the determined condition information generating unit judges whether or not prefetched instruction is a condition generate instruction which determines a condition deciding to perform the branching and, when the instruction is a condition generate instruction, performs operation according to the condition generate instruction to generate the determined condition information using the operation result. In this unit, a judgment about a condition generate instruction is made along with operation processing.

According to a seventh aspect of the invention, in the instruction prefetching apparatus defined in the sixth aspect, the condition generate instruction includes information indicating that the instruction is a condition generate instruction, and analyzing the instruction is performed along with operation processing.

According to an eighth aspect of the invention, an instruction prefetching method for prefetching instruction from a storage unit in a computer executing the instruction, comprises the steps of: judging whether a prefetched instruction is a branch instruction which instructs branching and outputting a branch signal when the instruction is a branch instruction; judging whether a condition deciding to perform the branching of the branch instruction is already determined or not when the branch signal is output, and outputting determined condition information corresponding to the condition judged to have been determined, such that the information can be used in a following step for generating prefetch address; and generating an address of an instruction to be prefetched based on the determined condition information when the determined condition information is output in the above determined condition information generating step. In this method, an instruction address is generated according to a condition already determined.

According to a ninth aspect of the invention, the instruction prefetching method defined in the eighth aspect includes the determined condition information generating step which includes: a condition determination signal generating step of judging whether a condition deciding to perform the branching of the branch instruction is already determined or not and outputting a condition determination signal when the condition is already determined; and a condition determination judging step of obtaining the determined condition, when the condition determination signal is output, to generate the determined condition information based on the obtained condition. This step informs whether or not a condition is already determined by a condition determination signal.

According to a tenth aspect of the invention, the instruction prefetching method defined in the eighth aspect includes the determined condition information generating step where a judgment is made whether or not a prefetched instruction is a condition generate instruction which determines a condition deciding to perform the branching and, when the instruction is a condition generate instruction, performs operation according to the condition generate instruction to generate the determined condition information using the operation result, and the judgment about the condition generate instruction is made along with operation processing.

According to an eleventh aspect of the invention, in the instruction prefetching method defined in the tenth aspect, the condition generate instruction includes information indicating that instruction is a condition generate instruction, and analyzing this instruction is performed along with operation processing.

BRIEF DESCRIPTION OF THE DRAWINGS

FIG. 8 is a diagram showing an example of a program as a processing object.

PREFERRED EMBODIMENTS OF THE INVENTION

Embodiment 1

An instruction prefetching apparatus according to a first embodiment of the invention uses a condition determination signal which indicates whether a branch condition is determined or not and prefetches an instruction corresponding to a condition when the condition is already determined.

Figure 1:
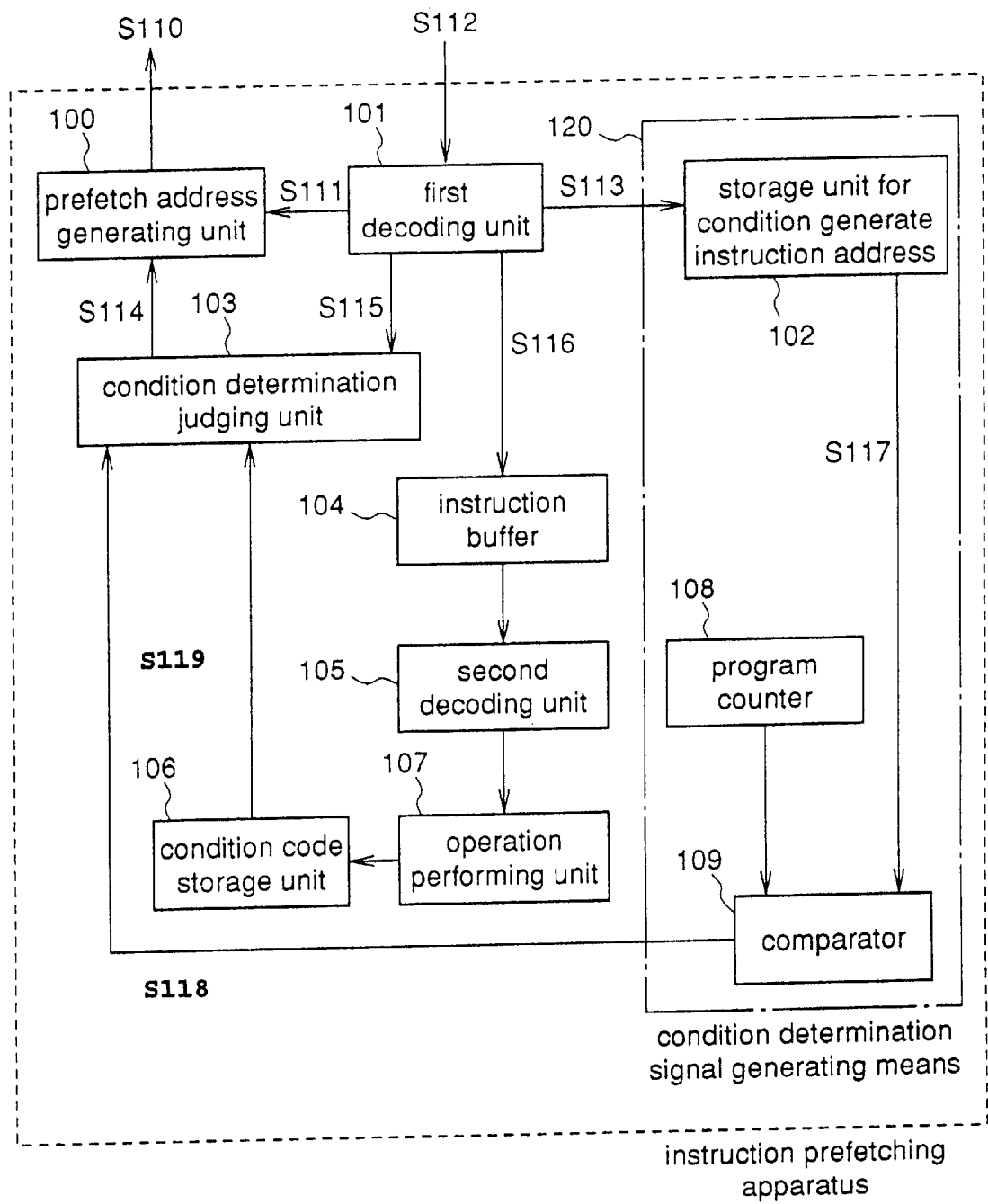
FIG. 1 is a block diagram illustrating the configuration of an instruction prefetching apparatus according to a first embodiment of the invention

FIG. 1 is a block diagram illustrating the configuration of the instruction prefetching apparatus according to the first embodiment of the invention. As shown in the figure, the instruction prefetching apparatus according to the first embodiment comprises a prefetch address generating unit 100, a first decoding unit 101, a storage unit for condition generate instruction address 102, a condition determination judging unit 103, an instruction buffer 104, a second decoding unit 105, a condition code storage unit 106, an operation performing unit 107, a program counter 108, and a comparator 109.

The prefetch address generating unit 100 generates an address of a next prefetch target using prefetch address information S114 output from the condition determination judging unit 103 and outputs a prefetch address signal S110 as an output of the instruction prefetching apparatus. The first decoding unit 101 performs decoding processing to a prefetched instruction S112 to obtain information S116 indicating the content of the instruction and outputs it to the instruction buffer 104 which is later described.

Further, the first decoding unit 101 works as a branching judging means for judging whether the instruction is a branch instruction or not and outputting a branch signal when the instruction is a branch instructions When the instruction S112 is a branch instruction, this unit outputs a signal S111 indicating an address of a branch target for the conditional branch instruction and a signal S115 indicating a branch condition of the branch instruction. The signals S111 and S115 are treated as branch signals indicating that the instruction is a branch instruction. Moreover, the first decoding unit 101 judges whether or not the instruction is an instruction changing a condition code (a zero flag, for example), that is, a condition generate instruction, and when the instruction is a condition generate instruction, this unit outputs an instruction address S113 of the condition generate instruction S112 to the storage unit for condition generate instruction address 102 which is later described while outputting an indetermination signal S115 to a condition determination judging means 103.

The condition determination judging unit 103 generates prefetch address information using a signal S115 indicating a branch condition, which is input from the first decoding unit 101, and a condition code S119 obtained from the condition code storage unit 106, and outputs the information to the prefetch address generating unit 100.

The instruction buffer 104 temporarily stores a signal S116 indicating the content of the instruction obtained by the decoding processing at the first decoding unit 101 for a processing at a following stage. The second decoding unit 105 takes the signal S116 temporarily stored from the instruction buffer 104, and decodes it sequentially to output a signal for controlling the operation processing at the operation performing unit 107 which is later described, according to the obtained result. The condition code storage unit 106 stores condition codes including branch condition, which are used in the processing including judgment such as conditional branch processing. The operation performing unit 107 performs operation according to a control signal input from the second decoding unit 105 and outputs a signal indicating the operation result to the condition code storage unit 106 when a condition code stored in the condition code storage unit 106, which is later described, is changed according to the operation result.

The storage unit for condition generate instruction address 102 works as a first instruction address storage unit for storing an address of a condition generate instruction, and stores an instruction address S113. The program counter 108 is a register for storing an address of an instruction being executed in a processor including the instruction prefetching apparatus and works as a second instruction address storing unit for storing an address of an instruction being currently executed by the operation performing unit 107. The comparator 109 performs a comparison between an instruction address S117 obtained from the storage unit for condition generate instruction address 102 and an address stored in the program counter 108 and, when these addresses match each other, a signal indicating this fact is output. The storage unit for condition generate instruction address 102, the program counter 108, and the comparator 109 works as a condition determination signal generating unit 120 for judging whether a condition deciding to perform a branch of a branch instruction is already determined or not and outputting a condition determination signal S118 when the condition is already determined.

Moreover, the instruction prefetching apparatus according to the first embodiment further comprises a branch predicting unit identical to the prior art one although the unit is not illustrated in FIG. 1, and in this apparatus, when the condition determination signal S118 is not input to the condition determination judging unit 103, the branch predicting unit is used for branch prediction and the predicted address is input to the prefetch address generating unit 100.

Here a description is given of the schematic operation of the instruction prefetching apparatus of the first embodiment having the above configuration.

At a timing, an address of an instruction to be fetched next is generated by the prefetch address generating unit 100 to be output as a prefetch address signal S110. In the processor including the instruction prefetching apparatus, an instruction is fetched using this prefetch address signal S110 and the fetched instruction S112 is input to the instruction prefetching apparatus. At a next timing, the prefetched instruction S112 is input to the first decoding unit 101 to be decoded.

The first decoding unit 101 judges whether the instruction S112 is a conditional branch instruction, and a condition generate instruction. When the instruction S112 is a conditional branch instruction, the first decoding unit 101 outputs a signal S111 to a prefetch address generating unit 100 while outputting a signal S115 indicating a branch condition of the branch instruction to the condition determination judging unit 103. Here it is assumed that as a signal indicating a branch target address, a signal Sill is output which indicates a difference between an address of a previously prefetched instruction and a branch target address. When the instruction S112 is a condition generate instruction, the first decoding unit outputs a signal S113 indicating an instruction address of the instruction S112 to the storage unit for condition generate instruction address 102 while outputting an indetermination signal S115 to a condition determination judging means 103. Judging whether or not the instruction is a condition generate instruction can be performed when the instruction S112 is input, by making an assumption in advance that a certain type of instruction is equal to a condition generate instruction, for example, an arithmetic instruction is a condition generate instruction. Moreover, despite the type of the instruction S112, a signal S116 indicating the content of the instruction S112 is output to the instruction buffer 104.

After being temporarily stored in the instruction buffer 104, the signal S116 indicating the content of the instruction is taken by the second decoding unit 105 and subjected to decoding processing to interpret the content of the instruction. The second decoding unit 105 outputs a direction according to the interpreted content of the instruction to the operation performing unit 107 which performs an operation based on the input direction. The result of the operation is processed by the processor including the instruction prefetching apparatus, but the result which can affect a condition code is output to the condition code storage unit 106 for storage.

On the other hand, in the condition determination signal generating unit 120, when the address S113 of the instruction S112 is input to the storage unit for condition generate instruction address 102, this address is input with an address obtained from the program counter 108 to the comparator 109 to make a comparison between them. Since the program counter 108 stores an address of an instruction being currently executed in the processing performed by the processor including the instruction prefetching apparatus, this comparison reveals whether a condition generate instruction as a target is already executed. If this instruction is already executed, the condition determined by the execution result of this instruction S112 is judged to be determined, whereby a condition determination signal S118 indicating that the condition is already determined is output to the condition determination judging unit 103.

The condition determination judging unit 103 works differently corresponding to the respective inputs: a condition determination signal S118 from the condition determination signal generating unit 120, and a signal S115 as an indetermination signal or a signal indicating branch condition from the first decoding unit. When an indetermination signal S115 is input, reset processing is executed in the condition determination judging means 103 to reset the state which has been set using the condition determination signal S118 based on a condition generate instruction having been processed immediately before.

When both a signal S115 indicating branch condition and the condition determination signal S118 are input to the condition determination judging unit 103, a condition code is obtained from the condition code storage unit 106 to be output as a prefetch address information S114 to the prefetch address generating unit 100. On the other hand, when the signal S115 indicating branch condition is input but the condition determination signal S118 is not input, the condition determination judging unit 103 does not operate and a prediction from the branch predicting unit (not shown) is input to the prefetch address generating unit 100 for use, as described above.

Figure 2:
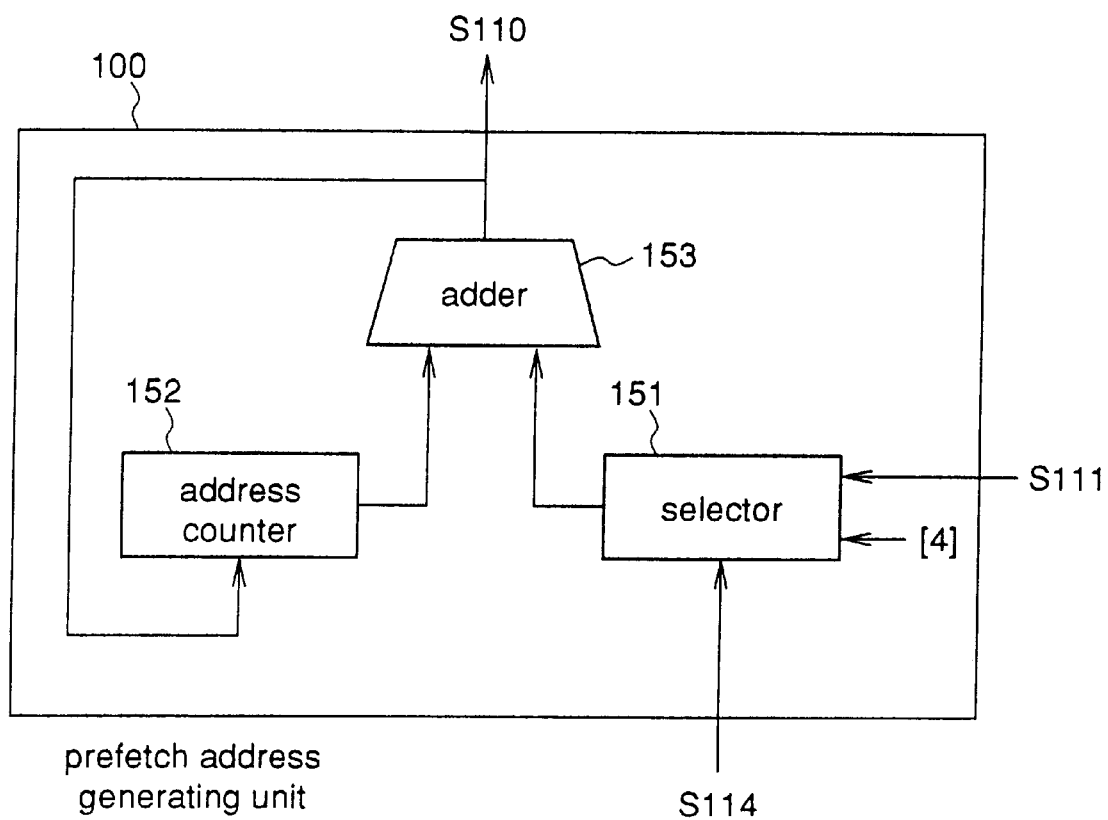
FIG. 2 is a block diagram showing components of the prefetch address generating unit of the first embodiment, which diagram explains the function of this unit.

The prefetch address generating unit 100 generates a prefetch address signal S110 using the input prefetch address information and outputs it. FIG. 2 is a diagram for explaining the operation of the prefetch address generating unit 100, and this diagram shows the main components in the inner structure of this unit. As shown in the figure, the prefetch address generating unit 100 comprises a selector 151, an address counter 152, and an adder 153.

The selector 151 selects a signal S111 or a fixed length (the value thereof is "4" in this case) corresponding to the prefetch address information S114 input from the condition determination judging unit 103 to output it to the adder 153. The signal Sill is input as a signal indicating a branch target address of the prefetched conditional branch instruction and used as a relative value of an address difference. The fixed length, on the other hand, decides a fixed value of the address difference, and indicates "4" when the value of the fixed length is four bytes.

The address counter 152 stores an address generated in the prefetch address generating process which is performed immediately before this process. When a selected signal is output to the adder 153, the adder 153 adds the selected signal to a value stored in the address counter 152 and the result of the addition is output as a prefetch address signal S110 which is a device output of the instruction prefetching apparatus. The prefetch address signal S110 is also output to the address counter 152 to be stored for next address generating process.

By the above-described operation, in the prefetch address generating unit 100, the adder 153 adds an address difference (relative value) sent by means of the signal S111 to the address of the previously prefetched instruction to obtain a prefetch address signal S110 which is a branch target address or adds a fixed length "4" to the address of the previously prefetched instruction to obtain a prefetch address signal S110 which is the address of the next instruction four bytes ahead.

Next, the operation for executing the program shown in FIG. 8 will be described with reference to a timing chart of FIG. 3, as in the case of the prior art apparatus.

Figure 3:
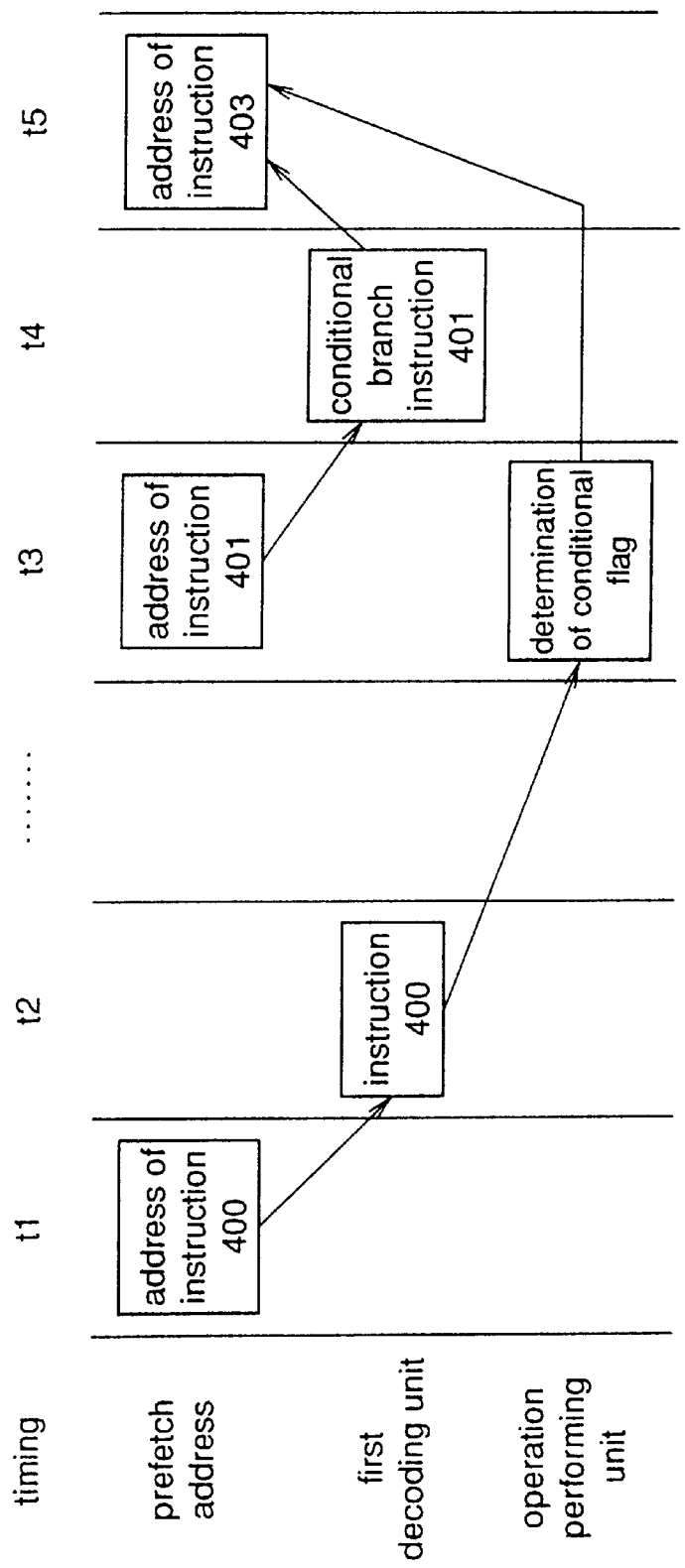
FIG. 3 is a timing chart schematically showing operations of processes according to the first embodiment.

At a timing $t_1$ shown in the chart of FIG. 3, an address of instruction 400 is generated by the prefetch address generating unit 100 to be output as a prefetch address signal S110. In the processor including the instruction prefetching apparatus, the instruction 400 is fetched using this prefetch address signal S110 and input to the instruction prefetching apparatus. At a next timing $t_2$, the prefetched instruction 400 is input to the first decoding unit 101 to be decoded.

Since the instruction 400 is not a conditional branch instruction, both the signal S111 indicating a branch address and the signal S115 indicating a branch condition are not output. On the other hand, since the instruction 400 is an instruction changing a condition code (zero flag) and thus judged as a condition generate instruction, the address of the instruction 400 is output to the storage unit for condition generate instruction address 102 for storage while the condition code indetermination signal S115 is input to the condition determination judging unit 103.

The signal S116 indicating the content of the instruction 400 is output to the instruction buffer 104. The second decoding unit 105 takes the instruction 400 from the instruction buffer 104 and decodes it to obtain an interpretation that the instruction is an add instruction, and informs the result of the decoding to the operation performing unit 107 by outputting a signal. The operation performing unit 107 performs an addition indicated by the instruction 400. When the result of the addition can affect a condition code, the operation performing unit 107 outputs the result of the addition to the condition code storage unit 106 which stores the changed condition code. At a timing $t_3$, a conditional flag is determined.

By the execution of the instruction 400 as a condition generate instruction, the condition determination signal S118 is output as the result of the processing performed by the condition determination signal generating unit 120. Therefore, the condition determination judging unit 103 to which the condition determination signal S118 is input takes a condition code S119 from the condition code storage unit 106.

At a timing $t_4$, instruction 401 as a conditional branch instruction is decoded by the first decoding unit 101. Because the instruction 401 is a branch instruction, the signal S115 indicating branch condition is output to the condition determination judging unit 103. The condition determination judging unit 103 instructs the prefetch address generating unit 100 to generate a correct address (an address of instruction 403) as an address of an instruction to be executed after the conditional branch instruction 401, based on the obtained condition code S119 according to the input signal S115. Thus, prefetching the instruction 403 is performed based on the prefetch address generated at a timing $t_5$.

Figure 9:
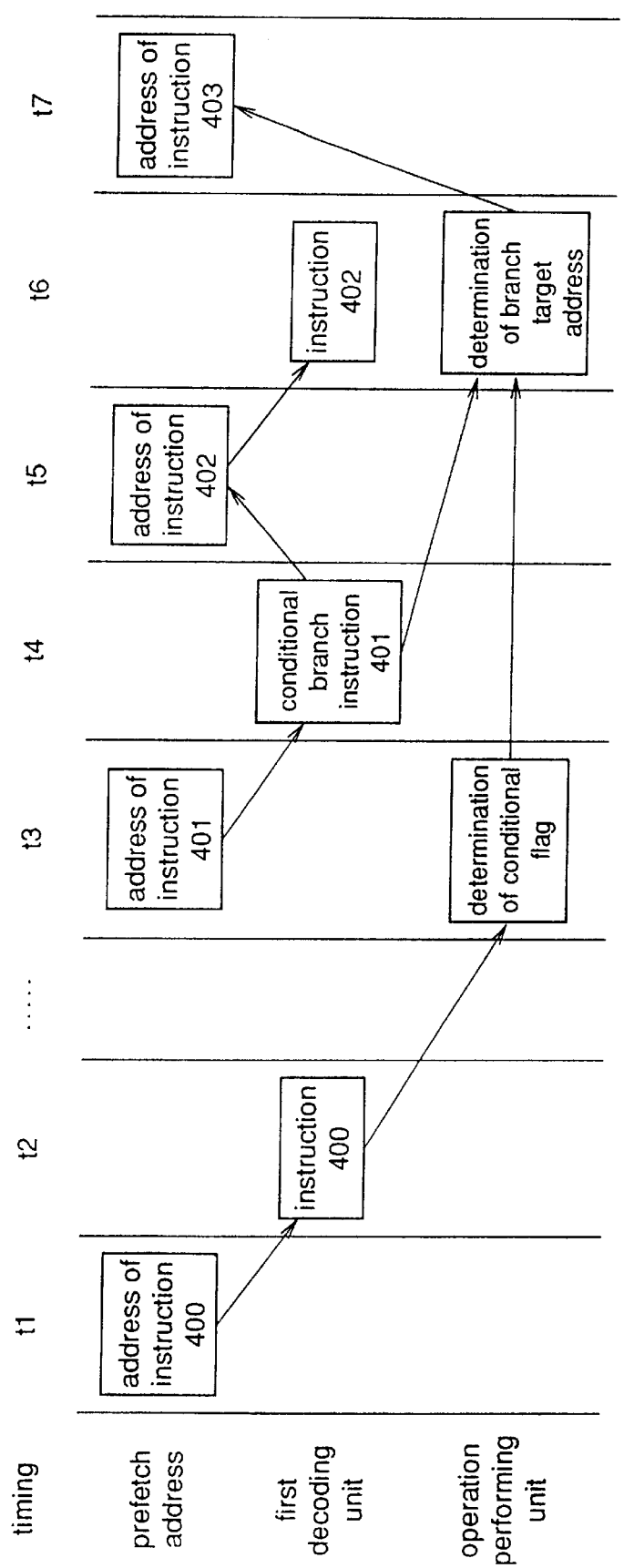
FIG. 9 is a timing chart schematically showing the operations of processes according to the prior art.

The comparison between the timing chart of FIG. 3 with the timing chart of FIG. 9 in which the prior art apparatus is used shows the following facts: it is found from FIG. 9 that at a timing $t_7$, an address of the instruction 403 as an instruction to be fetched correctly is output; the chart of FIG. 3 according to the first embodiment shows that it is at a timing $t_5$ that the address of the instruction 403 is output. This shows that in the first embodiment, use of determined condition instead of prediction realizes speeded-up processing.

Figure 4:
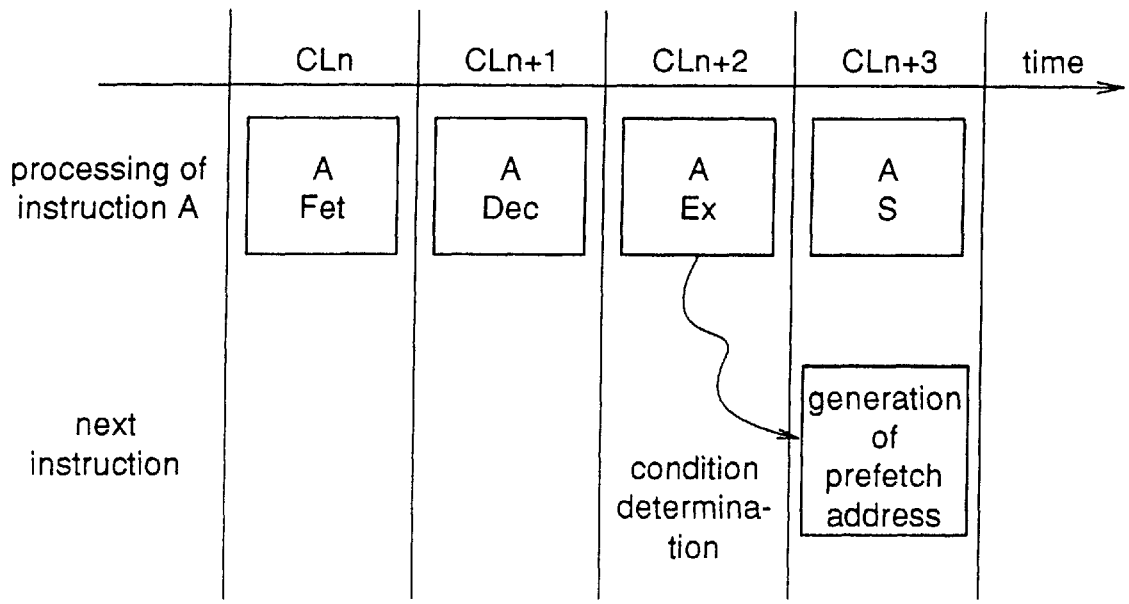
FIGS. 4(a) and 4(b) are diagrams for explaining the flow of the processes according to the first embodiment in contrast with that according to the prior art processing.
Figure 4:
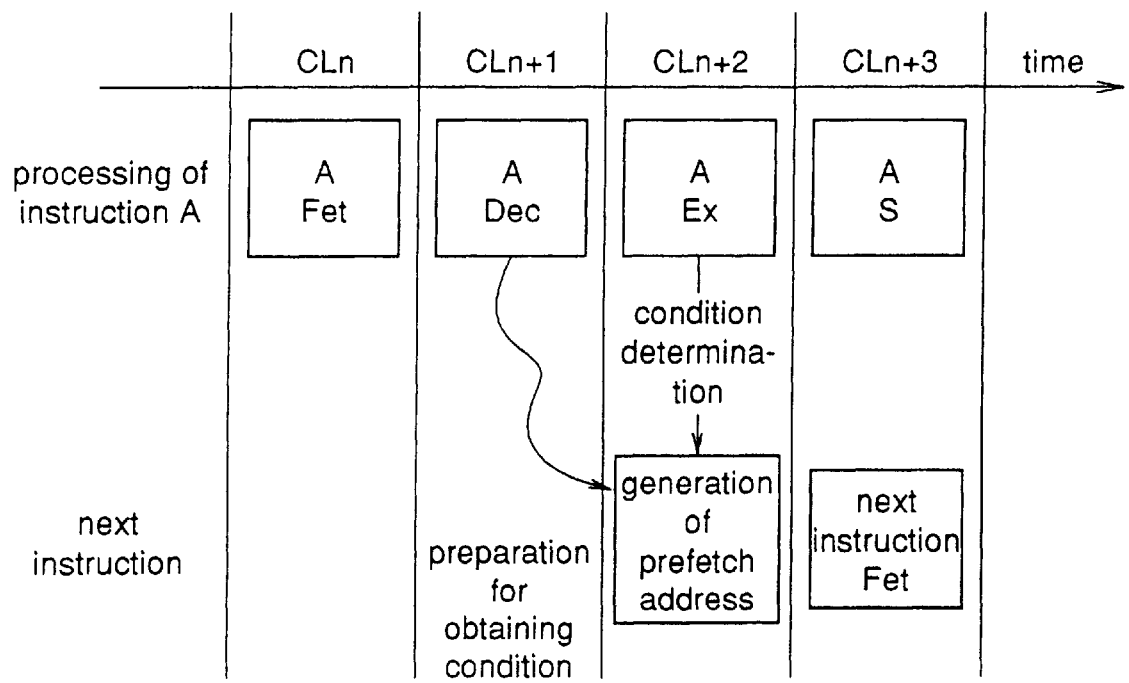

FIGS. 4(a) and 4(b) are diagrams for explaining the prefetch processing according to the first embodiment. FIG. 4(a) shows the case according to the prior art wherein, when an instruction A is a condition generate instruction, prefetching a next instruction based on a determined condition is impossible unless the prefetching is performed after executing the instruction A at a timing $CL_{n+2}$. On the other hand, in the case of the first embodiment shown in FIG. 4(b), since it is judged whether the instruction A is a condition generate instruction or not so as to prepare for obtaining determined condition when the instruction A is decoded at a timing $CL_{n+1}$, if the instruction A has been executed and its condition is already determined at a timing $CL_{n+2}$, it is possible to prefetch instruction B based on the determined condition.

Thus, according to the first embodiment of the invention, the instruction prefetching apparatus comprises a condition determination signal generating unit 120 and the condition determination judging unit 103, and in the apparatus, for decoding the prefetched instruction, the first decoding unit 101 judges not only whether the instruction is a branch instruction or not, but whether the instruction is a condition generate instruction, end outputs a signal indicating the judgment. This means that, for example, according to the judgment that the condition is determined, a signal S118 indicating this judgment is input to the condition determination judging unit 103. Therefore, if condition has been determined when the conditional branch instruction is prefetched, a correct prefetch address is generated without performing branch prediction, whereby a delay caused by prediction error at the execution of the branch instruction is eliminated, and a more efficient processing is realized.

Embodiment 2

An instruction prefetching apparatus according to a second embodiment of the invention judges in instruction execution processing whether branch condition is determined or not, and if the condition is determined, the instruction corresponding to the condition is prefetched.

Figure 5:
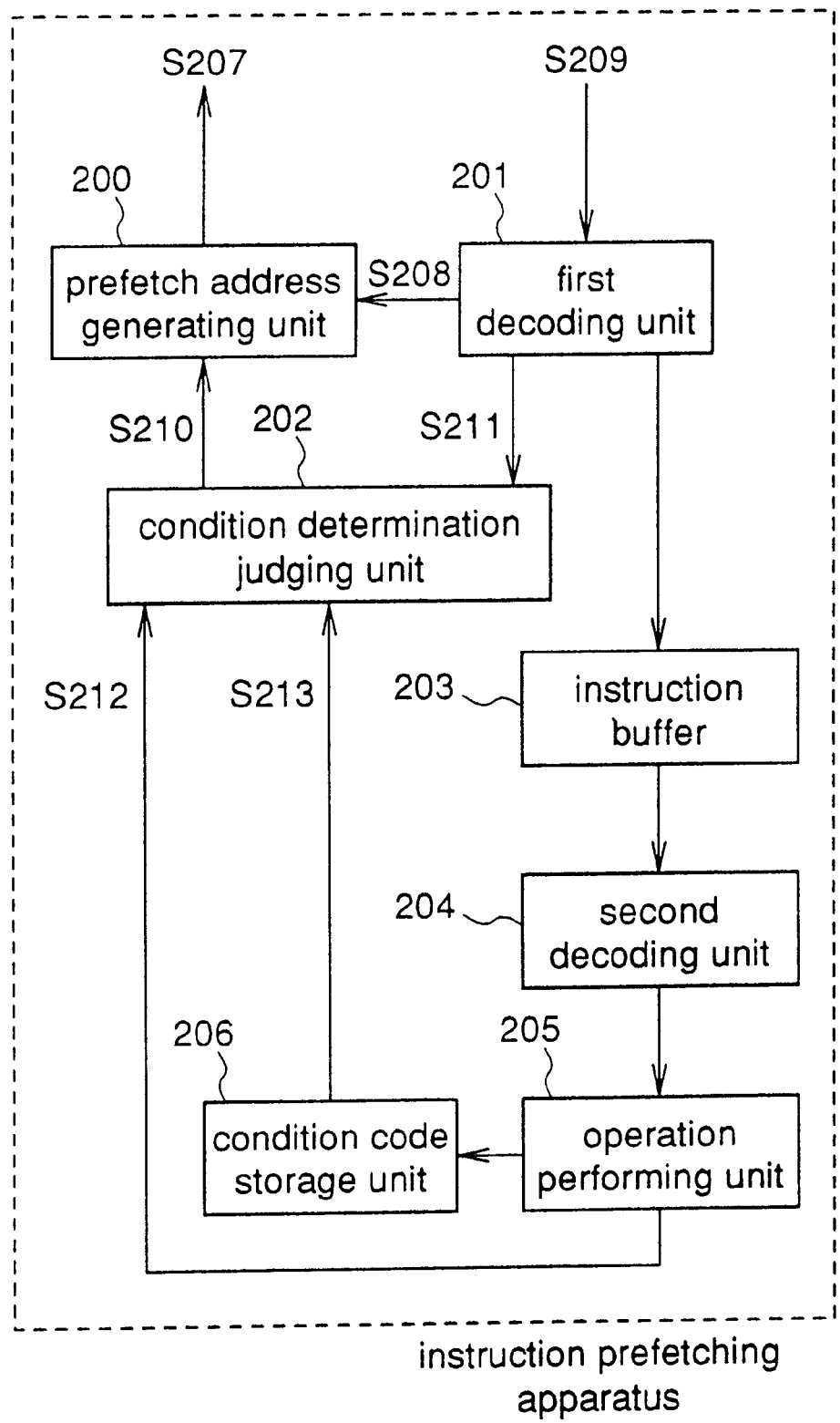
FIG. 5 is a block diagram illustrating the configuration of an instruction prefetching apparatus according to a second embodiment of the invention.
Figure 6:
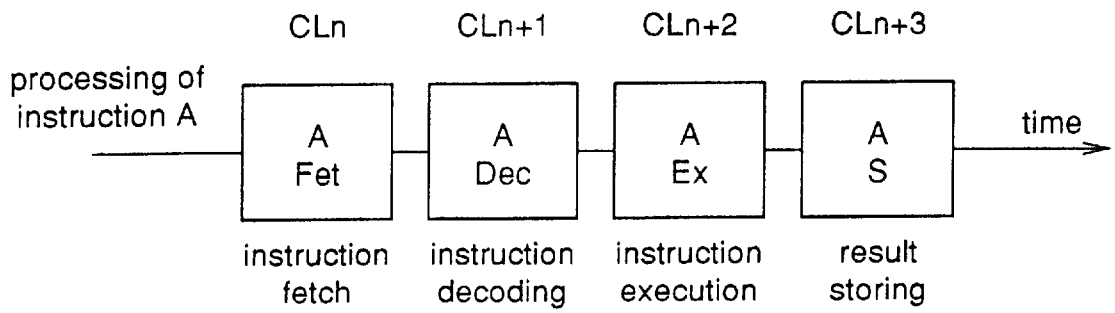
FIGS. 6(a) to 6(c) are diagrams for explaining processes performed by a processor of a computer.
Figure 6:
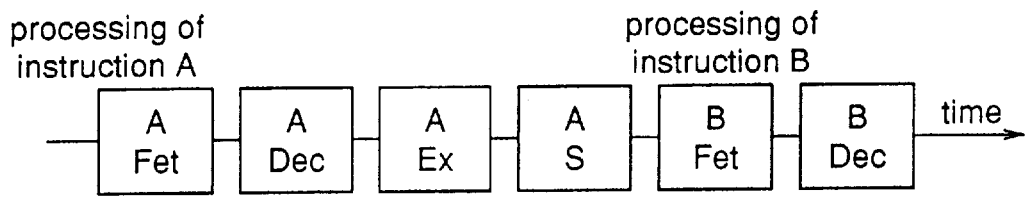
Figure 6:
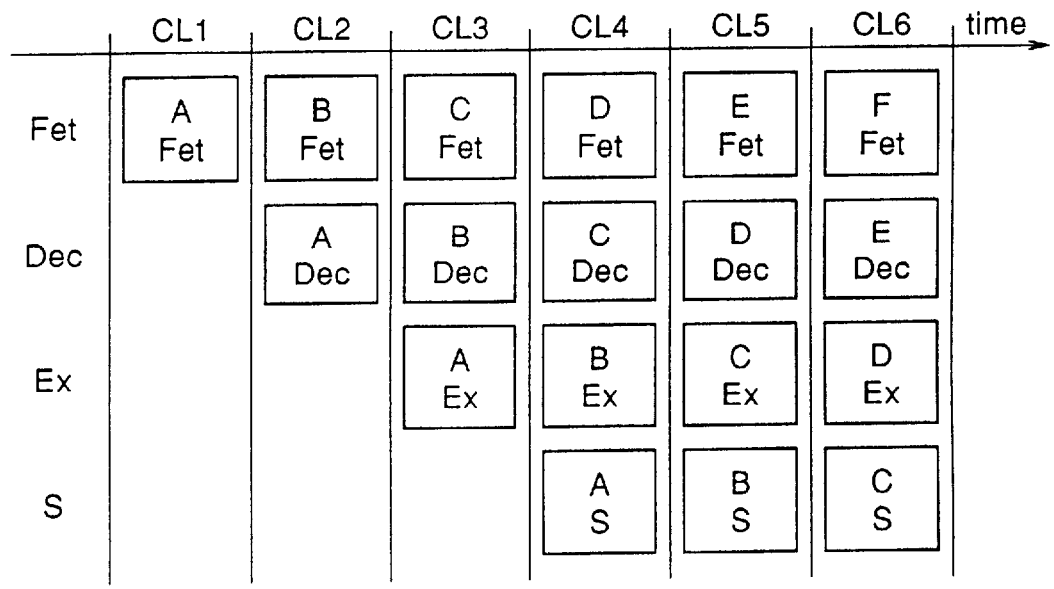
Figure 7:
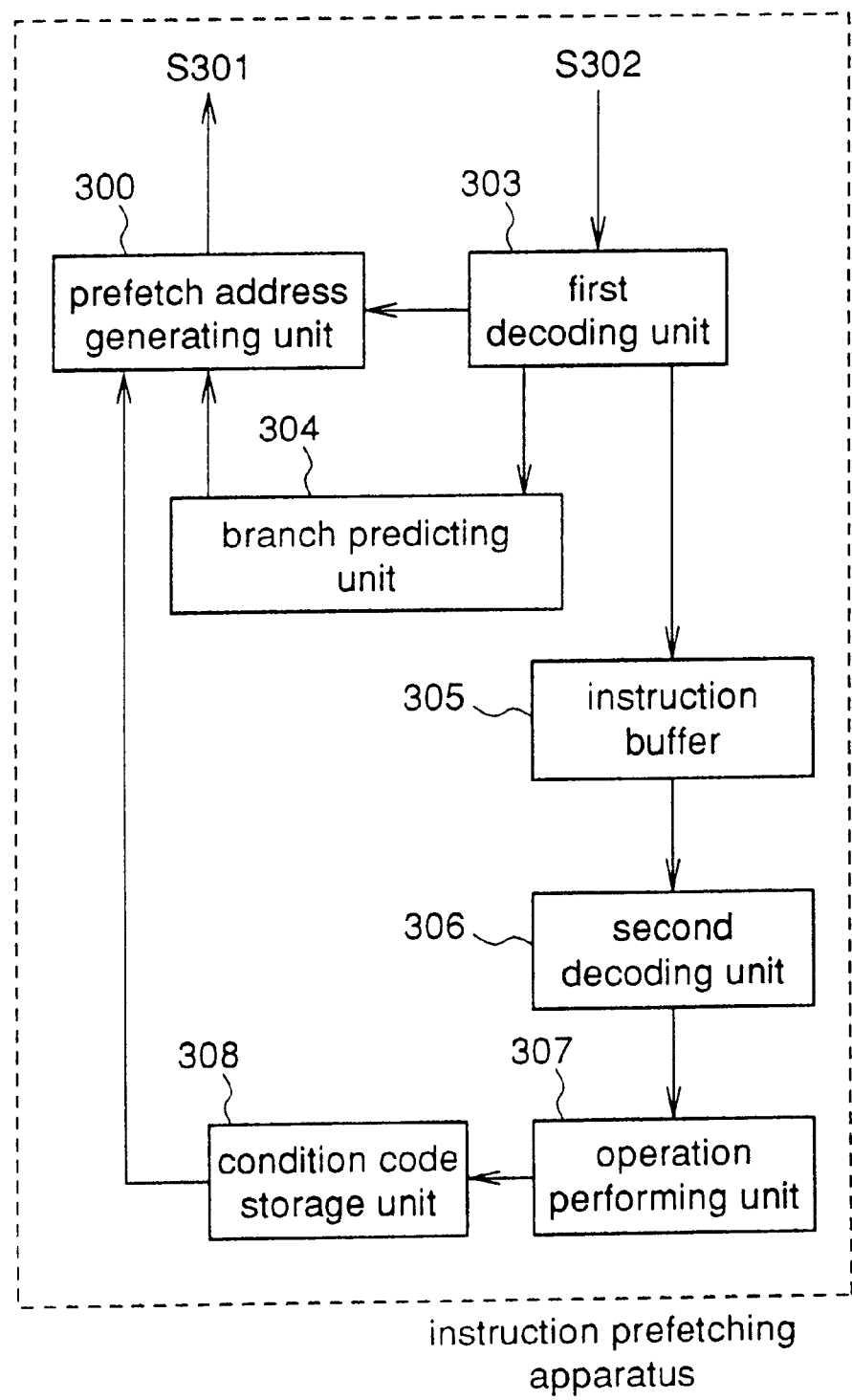
FIG. 7 is a block diagram illustrating the structure of a prior art instruction prefetching apparatus.

FIG. 5 is a block diagram illustrating the structure of the instruction prefetching apparatus according to the second embodiment of the invention. As shown in the figure, the instruction prefetching apparatus of the second embodiment comprises a prefetch address generating unit 200, a first decoding unit 201, a condition determination judging unit 202, an instruction buffer 203, a second decoding unit 204, a condition code storage unit 206, and an operation performing unit 205. In contrast with FIG. 1, the instruction prefetching apparatus according to the second embodiment does not include a condition determination signal generating unit 120 which the apparatus of the first embodiment comprises.

The first decoding unit 201 performs decoding processing to the prefetched instruction S209 to obtain information indicating the content of the instruction and output the information to the instruction buffer 203. The first decoding unit 201 also works as a branch judging unit for judging whether the instruction is a branch instruction and outputting a branch signal when it is judged that the instruction is a branch instruction. When the instruction S209 is a branch instruction, this unit outputs a signal S208 indicating an address of a branch target and a signal S211 indicating a branch condition of the branch instruction. The signals S208 and S211 are treated as branch signals for indicating that the instruction is a branch instruction.

The operation performing unit 205 works as a condition determination signal generating unit for generating a condition determination signal S212. If an instruction being executed is an instruction for changing a condition code, that is, a condition generate instruction and the changed condition code can affect a conditional branch instruction subsequent to the condition generate instruction, this unit outputs a condition determination signal S212 to the condition determination Judging unit 202 when the execution of the instruction is completed.

Therefore, a program which is a processing object for the instruction prefetching apparatus of the second embodiment is set such that an instruction fulfilling the above condition contains information indicating the fact within it. Due to the setting, a condition generate instruction, which can affect a following conditional branch instruction when being analyzed, is implemented by adding the information indicating the fact in a process of generating an executable program such as compiling. In the second embodiment, therefore, by giving an instruction the information indicating that the instruction is a condition generate instruction, a condition determination signal S212 is sent to the condition determination Judging unit 202 at the execution of the condition generate instruction.

The prefetch address generating unit 200, the instruction buffer 203, the second decoding unit 204, and the condition code storage unit 206 are identical to the respective units 100, 104, 105, and 106 in the apparatus of the first embodiment, and thus the description about the units is omitted.

A description is given of the schematic operations of the instruction prefetching apparatus configured above according to the second embodiment.

At a timing, in a prefetch address generating unit 200, an address of an instruction to be fetched next is generated and output as a prefetch address signal S207. In the processor including the instruction prefetching apparatus, an instruction is fetched using this prefetch address signal S207 and the fetched instruction S209 is input to the first decoding unit 201 for decoding processing.

The first decoding unit 201 judges whether the instruction S209 is a conditional branch instruction. When the instruction S209 is a conditional branch instruction, the first decoding unit 201 outputs to the prefetch address generating unit 200 a signal S208 indicating an address of a branch target for the conditional branch instruction while outputting to the condition determination judging unit 202 a signal S211 indicating a branch condition of the branch instruction. Further, whether the instruction S209 is a conditional branch instruction, this decoding unit outputs a signal indicating the content of the instruction S209 to the instruction buffer 104.

After temporarily stored in the buffer memory 203, a signal indicating the content of the instruction is taken by the second decoding unit 204, and subjected to decoding processing to interpret the content of the instruction. The second decoding unit 204 outputs an instruction according to the interpreted content of the instruction to the operation performing unit 205 which performs operation based on the input instruction. The result of the operation is processed in the processor including the instruction prefetching apparatus, and when the result can affect a condition code, it is output to the condition code storage unit 206 for storage.

In the instruction prefetching apparatus of the second embodiment, the operation performing unit 205 outputs a condition determination signal S212 to the condition determination judging unit 202 at output of a condition code. More specifically, when the instruction S209 is a condition generate instruction and a condition code obtained by the execution of the instruction is used for executing a subsequent conditional branch instruction, a condition determination signal S212 is outputted. Therefore, in the apparatus according to the second embodiment, for generating a prefetch address, a fact that a condition code stored in the condition code storage unit 206 is transmitted to the condition determination judging unit 202.

When both a signal indicating a branch condition and a condition determination signal S212 are input to the condition determination judging unit 202, a condition code is obtained from the condition code storage unit 206 and output as a prefetch address information S210 to the prefetch address generating unit 200. On the other hand, when a signal S211 indicating a branch condition is input but a condition determination signal S212 is not input, the condition determination judging unit 202 does not operate and a prediction obtained by a branch predicting unit (not shown) is input to the prefetch address generating unit 200 for use. The subsequent operation by the prefetch address generating unit 200 is equal to that in the first embodiment, and a prefetch address signal S207 is output as a device output of the instruction prefetching apparatus of the second embodiment.

Next, a description is given of the operation of the apparatus of the second embodiment under the program shown in FIG. 8 which is used in both the prior art and the first embodiment. In the operation of the apparatus of the second embodiment, since the same reference between timing and operation as that in the first embodiment is obtained, the description is given with reference to the timing chart of FIG. 3 used in the first embodiment.

At a timing $t_1$ shown in FIG. 3, an address of instruction 400 is generated in the prefetch address generating unit 200 to be output as a prefetch address signal S207. In the processor using the instruction prefetching apparatus, the instruction 400 is fetched using this prefetch address signal S207 and input to the instruction prefetching apparatus. At a next timing $t_2$, the prefetched instruction 400 is input to the first decoding unit 201 for decoding processing.

Since the instruction 400 is not a conditional branch instruction, a signal S208 indicating a branch address and a signal S211 indicating a branch condition are not output.

A signal indicating the content of the instruction 400 is output to the instruction buffer 203. The second decoding unit 204 takes the instruction 400 from the instruction buffer 203, and subjects it to decoding processing to obtain an interpretation that the instruction 400 is an add instruction, and transmits the result of the decoding to the operation performing unit 205 by outputting a signal. The instruction 400 is a condition generate instruction and the execution result can affect a conditional branch instruction 401 which follows. This fact, which is obtained from the information added to the instruction 400 in compiling, is transmitted to the operation performing unit 205 after interpretation by the second decoding unit 204.

The operation performing unit 205 performs addition according to the instruction 400. Since the result of the addition can affect a condition code, it is output to the condition code storage unit 206 which stores a changed condition code. At a timing $t_3$ shown in FIG. 3, a conditional flag is decided. Then, the operation performing unit 205 according to the second embodiment outputs a condition determination signal S212 to the condition determination judging unit 202 based on the information about the instruction 400 transmitted to the second decoding unit 204. Receiving the condition determination signal S212, the condition determination judging unit 202 obtains a condition code S213 from the condition code storage unit 206.

At a timing $t_4$, the instruction 401 as a conditional branch instruction is decoded by the first decoding unit 201. Since the instruction 401 is a branch instruction, a signal S211 indicating a branch instruction is output to the condition determination judging unit 202. When the signal S211 is input, the condition determination judging unit 202 instructs the prefetch address generating unit 200 to generate a correct address (an address of an instruction 403) as an address of an instruction to be executed following the conditional branch instruction 401, based on the obtained condition code S213. Therefore, prefetching the instruction 403 is performed based on a prefetch address generated at a timing $t_5$.

Thus, in the instruction prefetching apparatus of the second embodiment, it is set that a condition generate instruction includes information that the instruction is a condition generate instruction and can affect on a conditional branch instruction which follows, and at the execution of the instruction, the operation performing unit 205 generates a condition determination signal. Therefore, as in the first embodiment, correct prefetch address can be generated without branch prediction if the condition is already determined before prefetching the conditional branch instruction. This prevents delay occurred at the execution of the branch instruction, realizing more efficient processing.

In the second embodiment, it is necessary to perform the above-described processing for program compilation, and thus a program is required which includes such processing and corresponds to the apparatus of the second embodiment. This program, however, enables to perform an operation corresponding to instruction and to confirm the determined condition and generate a condition determination signal, thereby realizing simplification of the device structure of the instruction prefetching apparatus and the processing thereof.

What is claimed is:

1. An instruction prefetching apparatus for prefetching instruction from a storage unit in a computer executing the instruction, said apparatus comprising:

a branch judging means for judging whether a prefetched instruction is a branch instruction which instructs branching or not and outputting a branch signal when that instruction is a branch instruction;

a determined condition information generating means for judging whether a condition deciding to perform the branching of the branch instruction is already determined or not when the branch signal is output, and outputting, to a prefetch address generating means, determined condition information corresponding to the condition judged to be determined; and a prefetch address generating means for generating an address of a prefetch target based on the determined condition information input from the determined condition information generating means.

2. The instruction prefetching apparatus defined in claim 1, wherein the determined condition information generating means comprises:

a condition determination signal generating means for judging whether the condition deciding to perform the branching of the branch instruction is already determined and outputting a condition determination signal when the condition is already determined; and a condition determination judging means for obtaining the determined condition when the condition determination signal is output, and generating determined condition information according to the obtained condition.

3. The instruction prefetching apparatus defined in claim 2 including the condition determination signal generating means, said means comprising:

a first instruction address storage means for storing an address of an instruction output from the branch judging means;

a second instruction address storage means for storing the address of an instruction being currently executed; and a comparing means for making a comparison between the address stored in the first instruction address storage means and that stored in the second instruction address storage means and outputting the condition determination signal to the condition determination judging means when the comparison shows that the addresses match.

4. An instruction prefetching apparatus for prefetching instruction from a storage unit in a computer executing the instruction, said apparatus comprising:

(a) a branch judging means for judging whether a prefetched instruction is a branch instruction that instructs branching or not and outputting a branch signal when that instruction is a branch instruction;

(b) a determined condition information generating means for judging whether a condition deciding to perform the branching of the branch instruction is already determined or not when the branch signal is output, and outputting, to a prefetch address generating means, determined condition information corresponding to the condition judged to be determined, said determined information generating means including (1) a condition determination signal generating means for judging whether the condition deciding to perform the branching of the branch instruction is already determined or not and outputting a condition determination signal when the condition is already determined, said condition determination signal generating means including (i) a first instruction address storage means for storing an address of an instruction output from the branch judging means;

(ii) a second instruction address storage means for storing the address of an instruction being currently executed; and (iii) a comparing means for making a comparison between the address storied in the first instruction address storage means and that stored in the second instruction address storage means and outputting the condition determination signal to the condition determination judging means when the comparison shows that the addresses match; and (2) a condition determination judging means for obtaining the determined condition when the condition determination signal is output, and generating determined condition information according to the obtained condition;

(c) a prefetch address generating means for generating an address of a prefetch target based on the determined condition information input from the determined condition information generating means; and (d) wherein said branch judging means judges whether prefetched instruction is a condition generate instruction or not and, when the instruction is a condition generate instruction, outputs an address of the instruction to the first instruction address storage unit and a condition indetermination signal to the condition determination judging means, and further outputs information indicating the branch condition of the branch instruction to the condition determination judging means as the branch signal to be output and information indicating an address of a branch target of the branch instruction to the prefetch address generating means.

5. The instruction prefetching apparatus defined in claim 4 wherein the condition determination judging means, receiving the condition determination signal, outputs to the prefetch address generating means condition determination information indicating whether an address to be used is the address of an instruction following the branch instruction or the branch target address.

6. An instruction prefetching apparatus for prefetching instruction from a storage unit in a computer executing the instruction, said apparatus comprising:

(a) a branch judging means for judging whether a prefetched instruction is a branch instruction that instructs branching or not and outputting a branch signal when that instruction is a branch instruction;

(b) a determined condition information generating means for judging whether a condition deciding to perform the branching of the branch instruction is already determined or not when the branch signal is output, and outputting, to a prefetch address generating means, determined condition information corresponding to the condition judged to be determined, and further judging whether or not prefetched instruction is a condition generate instruction that determines a condition deciding to perform the branching and, when the instruction is a condition generate instruction, performing operation according to the condition generate instruction to generate the determined condition information using the operation result.

7. The instruction prefetching apparatus defined in claim 6 wherein the condition generate instruction includes information indicating that the instruction is a condition generate instruction.

8. An instruction prefetching method for prefetching instruction from a storage unit in a computer executing the instruction, said method comprising the steps of:

judging whether a prefetched instruction is a branch instruction which instructs branching and outputting a branch signal when the instruction is a branch instruction;

judging whether a condition deciding to perform the branching of the branch instruction is already determined when the branch signal is output, and outputting determined condition information corresponding to the already determined condition so that the information can be used in a following step for generating a prefetch address; and generating an address of a prefetch target based on the determined condition information when the determined condition information is output.

9. The instruction prefetching method defined in claim 8 including the determined condition information generating step which includes:

a condition determination signal generating step of judging whether a condition deciding to perform the branching of the branch instruction is already determined and outputting a condition determination signal when the condition is already determined; and a condition determination judging step of obtaining the determined condition, when the condition determination signal is output, to generate the determined condition information based on the obtained condition.

10. An instruction prefetching method for prefetching instruction from a storage unit in a computer executing the instruction, said method comprising the steps of:

judging whether a prefetched instruction is a branch instruction that instructs branching and outputting a branch signal when the instruction is a branch instruction;

judging whether a condition deciding to perform the branching of the branch instruction is already determined or not when the branch signal is output, and outputting determined condition information corresponding to the already determined condition so that the information can be used in a following step for generating a prefetch address;

generating an address of a prefetch target based on the determined condition information when the determined condition information is output in the above determined condition information generating step; and judging whether or not a prefetched instruction is a condition generate instruction that determines a condition deciding to perform the branching and, when the instruction is a condition generate instruction, performs operation according to the condition generate instruction to generate the determined condition information using the operation result.

11. The instruction prefetching method defined in claim 10 wherein the condition generate instruction includes information indicating that instruction is a condition generate instruction.

* * * * *